United States Patent [19]

Herman

[11] 3,782,634

[45] Jan. 1, 1974

[54] VEHICLE MOUNTED LIQUID DISTRIBUTOR APPARATUS

[75] Inventor: John R. Herman, Monroe Center, Ill.

[73] Assignee: Swenson Spreader & Mfg. Co., Lindenwood, Ill.

[22] Filed: Dec. 15, 1972

[21] Appl. No.: 315,664

[52] U.S. Cl.................. 239/156, 222/178, 239/163, 239/524
[51] Int. Cl............................................. B05b 9/06
[58] Field of Search.................... 239/155, 156, 157, 239/163, 524, 550; 222/63, 178

[56] References Cited
UNITED STATES PATENTS

| | | | |
|---|---|---|---|
| 3,344,993 | 10/1967 | Wilder et al. | 239/164 |
| 3,356,261 | 12/1967 | Stein | 239/156 X |
| 3,441,039 | 4/1969 | Rawson | 239/156 |
| 3,529,772 | 9/1970 | Brodersen | 239/157 |

Primary Examiner—M. Henson Wood, Jr.
Assistant Examiner—Michael Y. Mar
Attorney—Vernon J. Pillote

[57] ABSTRACT

A liquid distributor apparatus for use on a vehicle including a liquid product supply tank and a pump for pumping liquid from the tank to a spray bar system for spreading liquid product in a preselected width of spread along a path traversed by the vehicle. The rate of flow of liquid product from the spray bar system is varied with vehicle speed under the control of a vehicle speed sensor and a product flow meter which senses rate of flow of product to the spray bar system to maintain a preset spread density independent of the speed of the vehicle. The spray bar system includes a plurality of spray bars each arranged to spread liquid over the same width of spread but at relatively different flow rates and the flow of liquid product to the several spray bars is controlled by the product flow meter to maintain the spray bar pressure within a preselected pressure range.

12 Claims, 7 Drawing Figures

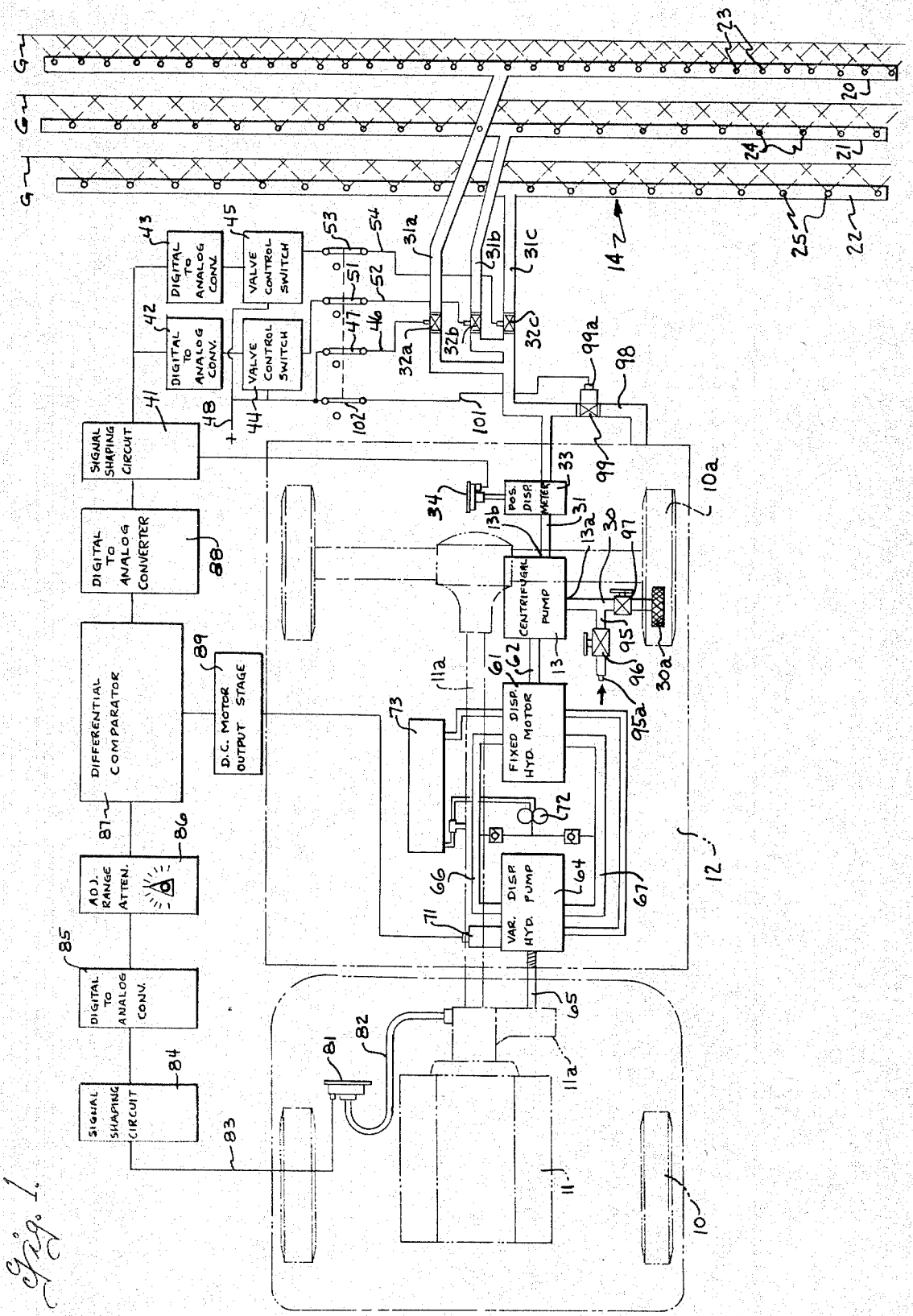

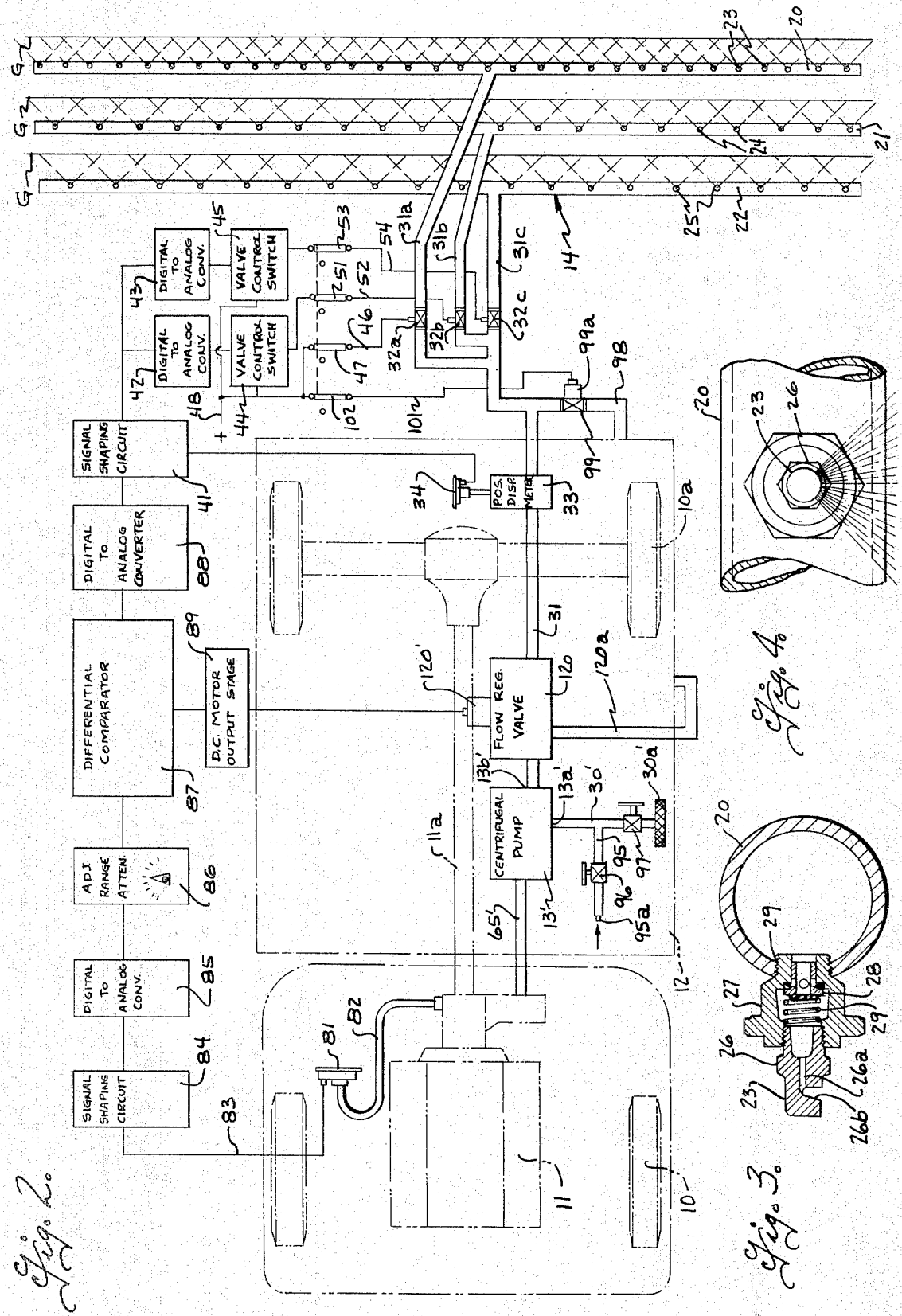

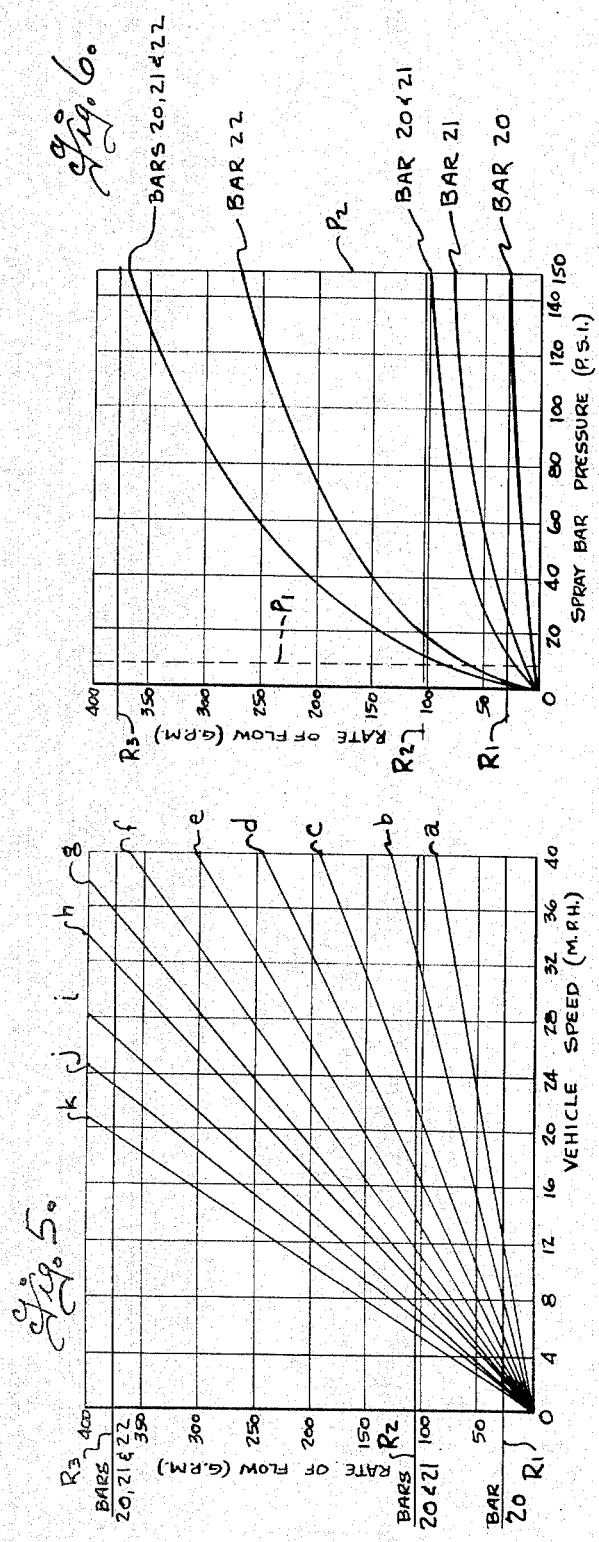
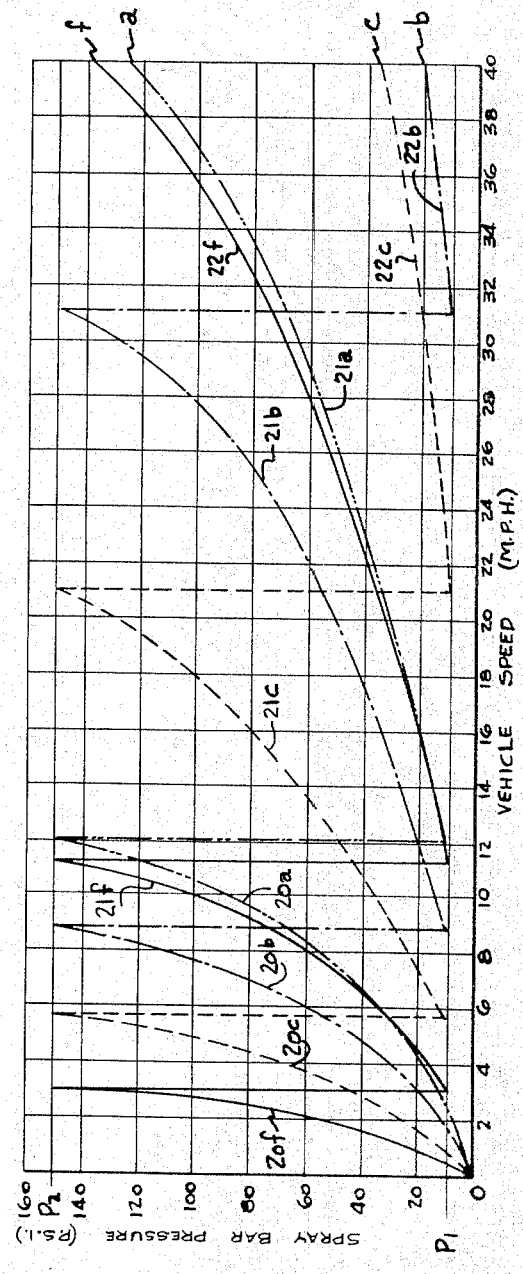
Fig. 5.
Fig. 6.
Fig. 7.

VEHICLE MOUNTED LIQUID DISTRIBUTOR APPARATUS

BACKGROUND OF THE INVENTION

The spreading of liquid product from a moving vehicle generally uniformly across a selected width of spread and at a preselected rate per unit of distance travelled by the vehicle to maintain a selected density of spread, has presented a particularly vexatious problem. It has been the general practice to provide liquid spreader apparatus with a spray bar having a set of fixed orifice spray nozzles spaced along the bar and to operate the liquid product supply pump at a fixed speed and to then drive the vehicle at a predetermined fixed speed in order to spread the liquid product uniformly along the path traversed by the vehicle. However, it is not always convenient or possible, due to various factors including the necessity of starting and stopping the vehicle, road conditions and obstacles, and driver error to maintain a precise vehicle speed during the spreading operation so that variations in spread density can and do occur with such an arrangement.

It is very desirable to be able to spread liquid product at widely different vehicle speeds from just above zero speed to relatively high speeds for example 30 to 40 miles per hour, and to also be able to vary the density of spread over a wide range. It has been proposed, as disclosed in the U. S. Pat. to Wilder et al. No. 3,344,993 issued Oct. 3, 1967 and assigned to the assignee of the present invention, to vary the speed of the product pump with the vehicle speed and to adjust the ratio to be maintained between the speed of the product pump and the vehicle speed to vary the density of spread. However, the pressure required to force a liquid product through a spray bar having fixed orifice spray nozzles varies with the viscosity of the liquid product and exponentially with the rate of flow through the nozzles, and fixed orifice spray nozzles generally operate satisfactorily only in a preselected pressure range. At very low nozzle pressures, the liquid tends to merely run out of the spray nozzles and is not spread in a generally uniform spray pattern along the length of the spray bar. Conversely, at higher pressures, the liquid product tends to splash and atomize as it is discharged onto the surface to be covered. Moreover, the varying pressure required to force the liquid product through the fixed orifice spray nozzles causes varying slip in the product pump so that the pump speed is not a reliable measure of the rate of flow of product to the spray bar system at widely varying spray bar pressures.

For the purpose of avoiding the problems of the varying spray bar pressure with varying flow rates, the aforesaid U. S. Pat. No. 3,344,993 disclosed the use of adjustable spray nozzles in which the size of the nozzle orifice was adjusted correlative with the pump speed, as by a pressure responsive regulator or a speed governor. An adjustable spray nozzle, however, is relatively complex and since a large number of orifices are required along the length of the spray bar, the adjustable spray nozzle arrangement markedly increases the complexity and cost of the distributor apparatus.

Many of the liquid products being spread are quite expensive and uniform and accurate spreading at widely selected spread densities and over widely varying vehicle speeds is very important. For example a glycol based de-icer material now being tested for use on airport runways presently costs about 72 cents a gallon. For anti-icing an 8,000 foot long, 100 foot wide runway at even a very low spread density of one gallon of deicer for each 2,000 square feet would cost about $288 for just one application. For heavier coverage necessary under more severe icing conditions, for example 1 gallon for every 500 square feet, the cost of a single application would be $1,100.

SUMMARY OF THE INVENTION

The present invention relates to a vehicular mounted liquid distributor apparatus of the type in which liquid product is pumped from a tank through a spray bar system to spread liquid product over a selected width of spread as the vehicle moves along a path, and an important object of this invention is to provide a vehicular mounted liquid distributing apparatus of this type using fixed orifice type spray nozzles and which is adapted to uniformly spread liquid product over an area traversed by the vehicle at vehicle speeds that vary over a wide range of speeds and at spread densities which are selectively adjustable over a wide range. In distributor apparatus using fixed orifice type spray nozzles, the pressure required to force the liquid product through the spray nozzles increases exponentially with the desired rate of flow through the nozzles. In accordance with the present invention, the rate of flow and pressure on the liquid product supplied to the spray bar system is varied, under the control of a vehicle speed sensor and a product flow meter which senses flow of liquid product from the pump to the spray bar system, to vary the rate of flow of liquid product from the spray bar system with vehicle speed and maintain a preset selectively adjustable spread density over a wide range of vehicle speeds. The spray bar system utilizes several sets of spray nozzles each arranged to spread liquid product generally uniformly over the same width of spread but at relatively different flow rates in response to spray bar pressures in a preselected pressure range, and the flow of liquid product to the different sets of spray nozzles is controlled by the product flow meter in a manner to maintain the spray bar pressures within the preselected pressure range.

The product flow meter is of the positive displacement type and is arranged intermediate the outlet product pump and spray bar system to measure rate of flow to the spray bar system independent of pressure variations in the spray bar system. In one embodiment of the invention, the speed of the product pump is varied to vary the rate of flow and pressure on the liquid product supplied to the spray system and in another embodiment of the invention, the rate of flow of product from the product pump to the spray bar system is controlled by a flow regulating valve.

These, together with other objects, features and advantages of this invention will be more readily understood by reference to the following detailed description when taken in connection with the accompanying drawings wherein:

FIG. 1 is a diagrammatic illustration of a vehicular mounted liquid distributor apparatus and controls therefor embodying the present invention;

FIG. 2 is a diagrammatic illustration of a modified form of liquid distributor apparatus and controls therefor embodying the present invention;

FIG. 3 is a sectional view through the distributor apparatus illustrating one of the fixed orifice spray nozzles;

FIG. 4 is an end view of one of the fixed orifice spray nozzles illustrating the spray pattern;

FIG. 5 is a graph illustrating the change in the rate of flow of liquid product from the spray bar system required at different vehicle speeds to maintain different spread densities;

FIG. 6 is a graph illustrating the change in spray bar pressure at different rates of flow of the liquid product through different sets of fixed orifice spray nozzles used in the spray bar system; and FIG. 7 is a graph illustrating the change in spray bar pressure with vehicle speed at four different density settings.

The liquid distributor apparatus is generally adapted for use on vehicles for spreading liquid products, for example liquid de-icer materials for use on airport runways and highways; liquid fertilizer, liquid insecticides and pesticides, liquid asphalt, etc. and is herein shown applied to a truck type vehicle, it being understood that the distributor apparatus could also be applied to trailer type vehicles. As diagrammatically illustrated in FIGS. 1 and 2, the vehicle includes front and rear ground engaging wheels **10, 10*a* and a motor 11 which, in the case of the truck type vehicle, can conveniently comprise the vehicle drive motor which is drivingly connected through a power train 11*a* to the rear wheels 10*a*. The liquid distributor apparatus in general includes a tank 12 mounted on the vehicle for storing a quantity of the liquid product to be distributed, a product pump 13 for pumping liquid product from the tank, and a spray bar system 14 for distributing the liquid material over a preselected width of spread as the vehicle moves along a path of travel. The spray bar system 14 utilizes fixed orifice spray nozzles and a control apparatus is provided for regulating the flow of the liquid product to the spray bar system in accordance with vehicle speed to maintain a uniform selectively adjustable spread density. The control apparatus is arranged to maintain a preset spread density from just above zero vehicle speed to relatively high speeds and the preset spread density to be maintained is adjustable over a wide range. For example, in the graph of FIG. 5,** the spread density is adjustable to a plurality of different density settings, as follows:

| Setting | Spread Density |
|---|---|
| a | 1 gal./2000 sq ft. |
| b | 1 gal./1500 sq. ft. |
| c | 1 gal./1000 sq. ft. |
| d | 1 gal./785 sq. ft. |
| e | 1 gal./636 sq. ft. |
| f | 1 gal./530 sq. ft. |
| g | 1 gal./454 sq. ft. |
| h | 1 gal./389 sq. ft. |
| i | 1 gal./340 sq. ft. |
| j | 1 gal./289 sq. ft. |
| k | 1 gal./250 sq. ft. | and the control apparatus is arranged to maintain the preset spread density over a wide range of vehicle speeds, for example from about 1 to 40 mph.

Spreading liquid material at a uniform spread density over a wide range of vehicle speeds and over a wide range of spread densities necessitates a very high percentage change in the rate of flow of liquid product from the spray bar system. For example, in order to spread material at a given spread density over vehicle speeds ranging from a low of about 2 or 3 miles per hour to a high of about 35 to 40 miles per hour would involve changing the rate of flow from the distributor system by a factor of 15 to 20 and, if the density of spread is also made adjustable over a wide range for example from 1 gal./2,000 sg. ft. to 1 gal./250 sq. ft., the flow rates may change by a factor of 100 or more from minimum density at minimum spreading speed to maximum density at maximum spreading speed. However, fixed orifice spray nozzles can only handle flows in a limited flow range. When the nozzle pressure is less than about 5 to 10 psi, the liquid product tends to merely run out without producing a satisfactory spray pattern for uniformly distributing the product across the spread width. Conversely, at very high nozzle pressures, the fluid is discharged from the spray nozzles at such a high velocity that problems are encountered with splashing and atomizing of the liquid product as it is discharged from the spray nozzles onto the ground. It is accordingly also desirable to limit the maximum nozzle pressure used during spraying.

In accordance with the present invention, the spray bar system 14 includes a plurality of spray bars, preferably at least three in number designated 20, 21 and 22 and the spray bars have a plurality of fixed orifice type spray nozzles 23, 24 and 25 respectively mounted at spaced locations along the spray bars. The spray bars can each be formed of a single pipe section as diagrammatically shown in the drawings. However, when the desired width of spread exceeds the width of the vehicle, the spray bars can be formed of multiple sections which are interconnected by flexible joints or piping to enable the outer ends of the spray bars to be folded during transportation to and from the area to be spread. Such foldable spray bars are well known and need not be described in detail.

The orifice size and spacing of the spray nozzles 23, 24 and 25 along the respective spray bar is selected such that each set of nozzles operates to spray liquid product generally uniformly over the same width of spread, but at relatively different flow rates when operated in the same range of nozzle or spray bar pressures. The spray nozzles are preferably of the type shown in FIGS. 3 and 4 and which include a generally horizontally extending nozzle body 26 having a nozzle orifice **26*a* arranged to direct the stream of liquid against a downwardly extending deflector surface 26*b* to produce a downwardly directed generally flat fan spray pattern, as shown in FIG. 4. Such nozzles are commercially available and may, for example, be of the type manufactured and sold by Spray Systems Company, 3201 Randolph Street, Bellwood, Ill. In order to minimize dripping of liquid product from the nozzles when the pressure is shut off, an anti-drip valve 27 is advantageously provided in the flow passage between each spray nozzle and spray bar, which valve includes a pressure operated valve member 28 yieldably biased by a spring 29** in a direction opposite the direction of flow from the spray bar to the nozzle to close and prevent flow from the spray bar to the nozzle when the pressure in the spray bar is reduced to substantially atmospheric pressure.

The number of spray nozzles and size of orifices in each set of spray nozzles will vary in different installations depending upon various factors including the width of spread, the minimum and maximum densities of material to be spread, and the minimum and maximum spreading speeds to be accommodated as well as the spray pattern of the nozzles used and the spacing of the nozzles above the ground. In general, in order to accommodate a very wide range of flow rates, the number and orifice size of one set of nozzles 23 on one spray bar 20 is selected to handle flows in a low flow range with nozzle or spray bar pressures generally varying in a preselected pressure range between a minimum pressure designated $P_1$ and a maximum pressure $P_2$. The number and orifice size of the nozzles 24 on the second spray bar 21 are selected to handle flows in an intermediate flow range with spray bar pressures varying in generally the same preselected pressure range ($P_1$-$P_2$), and the third set of nozzles 25 on spray bar 22 arranged to handle flows in an upper flow range with the spray bar pressures also varying in generally the same pressure range ($P_1$-$P_2$).

The rate of flow Q through a set of fixed orifice spray nozzles on a spray bar can be expressed generally by the equation:

$$Q = nkA \sqrt{P} \quad (1)$$

where $n$ is the number of fixed orifice nozzles, $k$ is the orifice constant of the spray nozzle and P is the pressure drop across the orifice.

Thus, flow from the spray bars 20, 21 and 22 can be respectively expressed as follows:

$$Q_1 = n_1 k_1 A_1 \sqrt{P} ; \quad (2)$$

$$Q_2 = n_2 k_2 A_2 \sqrt{P} ; \text{ and} \quad (3)$$

$$Q_3 = n_3 k_3 A_3 \sqrt{P} \quad (4)$$

The number $n_1$ and orifice size $A_1$ of the nozzles 23 on spray bar 20 are selected such that, at the minimum pressure $P_1$ at which the nozzles produce a satisfactory spray pattern, for example 5 to 10 psi, the rate of flow $Q_1$ from the spray bar 20 corresponds to the rate of flow required for the minimum spread density (curve $a$ FIG. 5) at the minimum vehicle spreading speed (for example 3 mph). As the pressure on spray bar 20 is increased from the mimimum pressure $P_1$, the flow rate from the spray bar 20 increases as a function of the square root of the spray bar pressure, as shown by the curve designated Bar 20 in FIG. 6, to a flow rate $R_1$ when the spray bar pressure reaches an upper pressure $P_2$. In order to limit further increase in spray bar pressure, the second spray bar 21 is utilized to handle flow rates in a range above the flow rate $R_1$. The number and orifice size of the nozzles 24 on spray bar 21 can be selected such that the rate of flow $Q_2$ from spray bar 21 at the minimum pressure $P_1$ generally corresponds to the rate $R_1$, that is the rate of flow $Q_1$ from spray bar 20 at the upper pressure $P_2$, and in that event the spray bar 20 can be shut off when spray bar 21 is turned on. However, it is deemed preferable, in order to prevent overspraying or underspraying at the time of transition, to use both spray bars 20 and 21 to handle flow rates above $R_1$. In other words, the flows from spray bars 20 and 21 are additive at rates above rate $R_1$. With this arrangement, the number of nozzles $n_2$ and the orifice size $A_2$ of the nozzles 24 on spray bar 20 are selected such that the flow $Q_1$ from spray bar 20 at the pressure $P_1$ plus the flow $Q_2$ from the spray bar 21 at pressure $P_1$ generally corresponds to the flow $Q_1$ from spray bar 20 at the upper pressure $P_2$. As will be seen from the curve designated Bars 20 and 21 in FIG. 1, the flow rate from the bars 20 and 21 increases as a function of the square root of the pressure from the rate $R_1$ at the lower pressure $P_1$ to a rate $R_2$ at the upper pressure $P_2$.

Spray bar 22 is utilized in handling flows at flow rates above the rate $R_2$. The number and orifice size of nozzles 25 on spray bar 22 can be selected such that the rate of flow $Q_3$ from spray bar 22 at the lower pressure $P_1$ generally corresponds to the rate $R_2$, that is the combined flows $Q_1$ and $Q_2$ from spray bars 20 and 21 at the upper pressure $P_2$, and in that event, the spray bars 20 and 21 can be turned off when spray bar 23 is turned on.

It is deemed preferable, however, to utilize all three spray bars at flow rates between $R_2$ and $R_3$ and the number $n_3$ and orifice size $A_3$ of the nozzles 25 are accordingly selected such that the sum of the flows $Q_1$, $Q_2$ and $Q_3$ from all three spray bars at the lower pressure $P_1$ generally corresponds to the rate $R_2$, that is the sum of the flows $Q_1$ and $Q_2$ from spray bars 20 and 21 at the higher pressure $P_2$. An additional spray bar or bars can be used if desired to handle flow rates above $R_3$. The graph of FIG. 7 indicates the change in spray bar pressure with vehicle speed at different spread densities. The curve designated $a$ in FIG. 7 indicates the change in spray bar pressure at the lowest spread density $a$ corresponding to one gallon for each 2,000 square feet. As will be seen by the portion of the curve designated 20$a$, the pressure in the spray bar 20 builds up exponentially to pressure $P_2$ and the pressure then drops to about $P_1$ when spray bar 21 is added. Thereafter the pressure builds up exponentially with vehicle speed in spray bars 20 and 21 as indicated by the curve portion designated 21$a$. As will be seen from FIG. 5, the maximum rate of flow at spread density $a$ is less than $R_2$ and accordingly spray bar 22 is not used at spread density $a$ at vehicle speeds up to 40 mph. Curve $b$ in FIG. 7 depicts the change in spray bar pressure with speed at spread density $b$. As will be seen, the pressure in spray bar 20 builds up exponentially with speed as indicated by curve portion 20$b$ to pressure $P_2$; the pressure then drops back to about $P_1$ when spray bar 21 is added and the pressure in spray bars 20 and 21 again builds up exponentially with speed along curve portion 21$b$ to pressure $P_2$. At that speed, spray bar 22 is added and the pressure drops to about $P_1$ and again builds up exponentially with speed in spray bars 20, 21 and 22 as indicated by the curve portion 22$b$. Similarly, curve portions 20$c$, 21$c$ and 22$c$ of curve $c$ in FIG. 7 illustrate the variation of pressure with speed as spray bars 20, 21 and 22 are sequentially used in spreading the liquid product at spread density $c$, and curve portions 20$f$, 21$f$ and 22$f$ of curve $f$ indicate the spray bar pressure variations with speed at spread density $f$. As will be seen from FIG. 7, the pressure in spray bar 20 rises above the minimum spray pressure $P_1$ at lower vehicle speeds, at the higher speed density settings, and spreading at these higher densities can start at even lower vehicle speeds, for example at 2 mph for density setting $b$ and even as low as 0.5 mph for density settings $f$ and higher.

From equation (1) it will be seen that the number of spray nozzles $n$ and the orifice size A of the spray nozzles on each spray bar are interrelated and that, if the number of nozzles on a spray bar is changed, it is necessary to also change the orifice size to maintain a preselected rate of flow Q at a given pressure P. In general the number of spray nozzles is selected so that the fan type spray patterns from adjacent nozzles, when they are spaced a selected distance above the ground, overlap somewhat throughout the operating pressure range $P_1$–$P_2$. In FIGS. 1 and 2 the spray patterns from the nozzles on the several spray bars are, for purpose of illustration, shown extending to the right as viewed in these figures, it being understood that the spray patterns are directed downwardly from the respective spray bars to the ground designated by the lines G. Preferably, all of the spray bars are spaced the same distance such as 1 foot above the ground. For example, a distributor apparatus for spreading liquid de-icer material over a 55 foot wide width of spread, at densities ranging from one gallon per 2,000 sq. ft. to one gallon for every 250 sq. ft. and over a wide range of vehicle speeds from about 2 to 3 miles per hour up to about 40 miles per hour at some densities, utilized 33 spray nozzles spaced along spray bar 20 and each having a 0.052 diameter orifice; 22 spray nozzles spaced along spray bar 21 and each having a 0.104 diameter orifice and 20 spray nozzles uniformly spaced along spray bar 22 and each having a 0.209 diameter orifice. The spacing of the spray nozzles along each spray bar is selected so that the fan type spray pattern, when the nozzles are spaced a selected distance such as 1 foot above the ground, would overlap somewhat with the spray patterns from adjacent nozzles of the set, throughout the operating pressure range, for example from about a range from about 10 psi to 150 psi. While the spray angle of the nozzles did vary somewhat as the pressure changed, it was found that the increased overlap of the spray patterns at higher nozzle pressures up to around 150 psi did not adversely affect the general uniformity of the distribution of product along the width of the spread. As graphically illustrated in FIG. 6, the above-described nozzle arrangement on the spray bar 20 will spray liquid at flow rates in a range $R_1$ from about 7 GPM up to about 28 GPM with spray bar pressures ranging from about 10 psi to 150 psi. Spray bar 22 with 22 larger size spray nozzles is arranged to spray liquid material in a higher range designated $R_2$ up to about 102 gallons per minute with the spray bar pressures varying generally in the same pressure range of about 10 to 150 psi, and the nozzles 23*a* on the spray bar 23 are arranged to spray liquid in still a flow range in the spray bar pressure range of about 10 to 150 psi.

The pump 13 has its inlet 13*a* connected as through a line 30 and screen 30*a* to the tank 12 to receive product therefrom, and its outlet 13*b* connected through a delivery line 31 to the spray bar system. As shown, the delivery line 31 has branches 31*a*, 31*b* and 31*c* respectively communicating with the spray bars 20, 21 and 22, and flow control valves 32*a*, 32*b* and 32*c* in the branches 31*a*, 31*b* and 31*c* respectively for controlling flow of liquid product from the delivery line to the several spray bars.

A positive displacement type flow meter 33 is provided in the delivery line 31 between the pump outlet 13*b* and the branches 31*a*, 31*b* and 31*c* leading to the spray bars to measure the rate of flow of liquid product to the spray bars substantially independent of the pressure in the spray bars or the viscosity of liquid product being spread. The positive displacement flow meter is essentially a positive displacement rotary hydraulic motor that is rotated by the fluid flowing therethrough at a speed correlative with the rate of flow and the flow meter operates a sensor 34 which produces an electrical output signal correlative with the rate of flow measured by the meter. While the sensor 34 can be of various different types such as a tachometer generator, it is preferably of the photoelectric type speed sensor disclosed in the U. S. Pat. to Swenson, No. 3,550,866, issued Dec. 29, 1970, to which reference is made for a more complete description. In general, the photoelectrical sensor includes an apertured disk which is rotated by the flow meter at a speed correlative with the meter speed and the apertured disk is arranged to interrupt a light beam to a photoelectric cell to produce a pulse or digital type output having a pulse repetition rate or frequency correlative with the speed of the flow meter and hence the rate of flow.

The valves 32*a*, 32*b* and 32*c* are normally closed and each have an electroresponsive actuator which is selectively energized under the control of the flow meter 33 and flow rate sensor 34 to open valve 32*a* and pass liquid product to spray bar 20 when the flow rate measured by the meter is below the rate $R_1$; to open valve 32*b* to pass product to spray bar 22 when the flow rate measured by the meter is between $R_1$ and $R_2$, and to open valve 32*c* to pass product to spray bar 22 when the flow rate is above $R_2$. As diagrammatically shown in FIGS. 1 and 2, the pulse or digital signal from the sensor flow rate 34 is applied through a signal shaping circuit 41 to digital-to-analogue converters 42 and 43 that convert the pulse-type signal to a voltage signal correlative in amplitude with the pulse repetition rate or frequency. The analog signals from converters 42 and 43 are respectively utilized to operate valve control switches 44 and 45. As diagrammatically illustrated, valve 32*a* which controls flow to spray bar 20 is connected through conductor 46 and selector switch 47 to a power supply conductor 48 leading to a suitable power supply source (not shown) so that valve 32*a* is energized and opened when the selector switch 47 is moved to the position shown in the drawings, to thereby pass fluid to the spray bar 20. Valve control switch 44 is connected to apply power from the power supply conductor 48 through selector switch 51 and conductor 52 to the valve 32*b* that controls flow to the spray bar 21. Selector switch 51 is interconnected with selector switch 47 so as to connect the valve control switch to the valve 32*b* when the selector switch 47 is in its "on" position shown in drawings, and valve control switch 44 is arranged to energize the actuator for valve 32*b* when the flow meter 33 senses flows in the intermediate range of flows $R_1$–$R_2$. Valve control switch 45 is also connected to apply power from conductor 48 through selector switch 53 and conductor 54 to the valve 32*c*, and selector switch 53 is also conveniently interconnected with selector switch 47 to connect the valve control switch 45 to the actuator for valve 32*c* when the selector switch 47 is in its "on" position shown in the drawings. Valve control switch 45 is arranged to operate and apply power to actuator for valve 32*c* when the flow meter senses flows in the upper range, that is between $R_2$ and $R_3$, to thereby open valve 32*c* and pass fluid to the spray bar 22.

As previously described, the control apparatus for the distributor is arranged to maintain a preselected spread density over a wide range of vehicle speeds and the spread density to be maintained is adjustable over a wide range. For this purpose, provision is made for varying the rate of flow of liquid product from the pump to the spray bar system, correlative with vehicle speed to maintain a preselected, selectively adjustable spread density. The pump 13 is preferably of the centrifugal type having a size and number of pump stages as required to deliver fluid in the maximum volume and pressure ranges encountered in the spreading operation. The rate of flow of fluid from the pump to the spray bar system can be controlled by varying the speed of the centrifugal pump and, in the embodiment shown in FIG. 1, a variable speed drive is provided for the centrifugal pump. The variable speed drive shown is of the so-called hydrostatic transmission type including a fixed displacement hydraulic motor 61 which is drivingly connected through a shaft 62 to the pump 13 and a variable displacement hydraulic pump 64 which is drivingly connected through a shaft 65 to a power take-off 11a from the motor 11. As diagrammatically shown, the variable displacement hydraulic pump is interconnected through conduits 66 and 67 to the fixed displacement hydraulic motor to drive the motor, and the displacement of the pump is adjustable by a reversible DC motor actuator 71 on the variable displacement hydraulic pump to vary the rate of flow of fluid from the pump 64 to the motor 61 and hence vary the speed of the motor 61 and the product pump 13 driven thereby. As is well known, such hydrostatic transmissions include a fluid makeup pump 72 which is operative to pass hydraulic fluid from a reservoir 73 to the conduits 66 and 67 to maintain the hydrostatic transmission system filled with hydraulic fluid.

The apparatus for controlling the pump speed includes a primary or ground speed sensor 81 for producing a signal correlative with ground speed and, as diagrammatically shown, may conveniently be of the photoelectric type disclosed in the aforementioned U. S. Pat. to Swenson, No. 3,550,866. The sensor 81 is connected as drive cable 82 to the speedometer cable or to a point in the transmission that senses the speed of the drive wheels. The ground speed sensor produces an output signal of the pulse or digital type correlative in pulse repetition rate or frequency with the ground speed and this signal is applied through conductors 83 to a signal shaping circuit 84 and the pulse output of the shaping circuit is applied to a digital-to-analog converter 85 that converts the pulse or digital ground speed signal to a voltage signal correlative in amplitude with the speed of the vehicle. The analog signal from converter 85 is correlative in amplitude with the vehicle speed and the analog speed signal is applied through an adjustable range attenuator 86 to a differential comparator 87. A signal from the flow meter sensor 34 is also applied through shaping circuit 41 to digital-to-analog converter 88 that converts the pulse or digital flow rate signal to a voltage signal correlative in amplitude with the rate of flow of product to the spray bar system. The voltage signal from converter 88 is also applied to the differential comparator 87 which compares the ground speed voltage signal with the flow rate voltage signal and operates a DC motor output stage 89 to drive reversible motor actuator 71 of the hydrostatic transmission in a direction correlative with the difference between the voltage signals applied to the differential comparator. The ratio to be maintained between the ground speed signals from the speed sensor 81 and the flow rate signals from flow sensor 34 is adjustable by the range attenuator 86 to thereby adjust the spread density to be maintained by the spreader apparatus. The control system thus operates to vary the speed of the product pump 13 and change the rate of flow and pressure on the liquid product supplied by the pump to the spray bar system in a manner to maintain a selected ratio between the speed of the flow meter sensor 34 and the ground speed sensor 81, which ratio is adjustable by the range attenuator 86.

The pump 13 can also be used for refilling the tank and, as diagrammatically shown, an intake line 95 communicates with the pump intake 13a and is connected through a manually operable valve 96 to an intake fitting 95a adapted for connection to an external product supply source. A manually operable shut-off valve 97 is also provided in the intake line and, when it is desired to refill the tank, valve 97 can be closed and valve 96 opened to connect the pump inlet to the external supply source. During refill of the tank with pump 13, fluid from the pump delivery line is passed from a pump bypass 98 back to the tank under the control of a bypass valve 99. Bypass valve 99 can be of the manually operated type but is conveniently electrically operated by an actuator 99a which is connected through conductor 101 and selector switch 102 to the power supply 48. Valve 99 is normally open and switch 102 is connected to selector switch 47 so that the valve 99 is energized to its closed position when the selector switches 47, 51 and 53 are in their "on" positions shown in the drawing.

A modified arrangement for regulating the flow of fluid from the product pump 13 to the spray bar system 14 is illustrated in FIG. 2. As in the preceding embodiment, the pump designated 13' has its inlet 13a' connected through a supply line 30' and filter 30a' to the product tank 12 to receive liquid product therefrom. In this embodiment, however, the centrifugal pump is conveniently driven directly from the prime mover or engine 11 as by a drive connection indicated at 65', and the pump outlet 13b' is connected through a flow regulating valve 120 to the delivery line 31. Flow regulating valve 120 has a reversible DC motor actuator 120' which is arranged to operate valve 120 to variably regulate the flow of fluid from the pump to the delivery line to vary the rate of flow and pressure on the liquid product supplied by the product pump to the spray bar system in a manner to maintain a preselected ratio between the speed of the ground sensor and the product flow sensor. Valve 120 can be a conventional variable flow control valve or can be of the pressure compensated type having a bypass 120a. As in the preceding embodiment, the reversible motor actuator 120' is operated from the control circuit to maintain a preselected ratio between the pump speed sensor and the ground speed sensor, which ratio is adjustable by the aforementioned range attenuator 86.

From the foregoing it is thought that the construction and operation of the distributor apparatus will be readily understood. The control apparatus is arranged to accurately maintain a present spread density over a wide range of vehicle speeds from just above zero speed up to relatively high speeds and the spread density is adjustable over a wide range. The product flow meter measures the flow from the pump to the spray bar system and accurately measures rate of flow of fluid product substantially indepedent of spray bar pressure or changes in viscosity of the liquid product. The spray bar system utilizes plural spray bars and the flow of liquid product to the several spray bars is controlled by the product flow meter in a manner to maintain the spray bar pressures generally within a preselected pressure range at which the spray nozzles are operative to uniformly spread the prouct over the spread width.

The embodiments of the invention in which an exclusive property or privilege is claimed are defined as follows:

1. In a liquid distributor apparatus for use on a vehicle to distribute liquid product in a preselected width of spread along a path traversed by the vehicle at a time rate of flow that varies correlative with vehicle speed to maintain a preset spread density, the distributor apparatus including a tank for carrying a quantity of liquid product on the vehicle, spray bar means extending crosswise of the vehicle for spreading the liquid product, and product pump means having an inlet connected to receive liquid product from the tank and an outlet connected through delivery conduit means to the spray bar means, the improvement comprising: said spray bar means including a first set of fixed orifice spray nozzles spaced apart along the spray bar means and arranged to spray liquid product generally uniformly along said preselected width of spread at time rates of flow in a first flow range in response to spray bar pressures in a preselected pressure range, and at least a second set of fixed orifice spray nozzles spaced apart along the spray bar means to spray liquid product generally uniformly along the same preselected width of spread at time rates of flow in a second relatively higher flow range in response to spray bar pressures in said preselected pressure range, liquid product flow rate sensing means including a positive displacement type flow meter in the delivery conduit means between the pump outlet and the spray bar means operative to measure flow of liquid product to the spray bar means substantially independent of the pressure on the liquid product and a first sensing means connected to said flow meter for producing a first electrical control signal correlative with the rate of flow of liquid product to said spray bar means, valve means for controlling flow of liquid product to said nozzle means and operative when said flow meter senses flows in said first flow range for passing liquid product only to said first set of nozzle means and operative when said flow meter senses flows in said second flow range for passing liquid product to said second set of nozzles, vehicle speed sensing means for producing a second electrical control signal correlative with the speed of the vehicle over the ground, and means responsive to said first and second control signals for controlling the flow of liquid product to said delivery conduit means to maintain a preset ratio between the speed of the vehicle and the time rate of flow of liquid product to the spray bar means, said last-mentioned means including means for adjusting the preset ratio to be maintained between the speed of the vehicle and the time rate of flow of liquid product to vary the speed density of liquid product.

2. A liquid distributor apparatus according to claim 1 wherein said valve means for controlling flow of liquid product to said nozzle means is operative when said flow meter senses flows in said second range of flows to pass liquid product to both said first and second sets of nozzle means.

3. A liquid distributor apparatus according to claim 1 wherein said product pump means comprises a centrifugal pump.

4. A liquid distributor apparatus according to claim 1 wherein said means for controlling the rate of flow of said liquid product to said delivery conduit means includes motor means for driving said centrifugal pump, and means for varying the speed of said product pump means.

5. A liquid distributor apparatus according to claim 1 wherein said means for controlling the rate of flow of said liquid product to said delivery conduit means includes a fluid regulating valve means for variably regulating flow from said pump means to said delivery conduit means.

6. A liquid distributor apparatus according to claim 1 wherein said spray bar means includes first and second spray bars respectively having said first and second sets of spray nozzles mounted thereon, said valve means for controlling flow of liquid product to said nozzle means being arranged to control flow from said delivery conduit means to said first and second spray bars.

7. In a liquid distributor apparatus for use on a vehicle to distribute liquid product in a preselected width of spread along a path traversed by the vehicle at a time rate of flow that varies with vehicle speed to maintain a preset spread density, the distributor apparatus including a tank for carrying a quantity of the liquid product on the vehicle, spray bar means extending crosswise of the vehicle for spreading the liquid product, and pump means having an inlet connected to the tank to receive liquid product and an outlet connected through delivery conduit means to the spray bar means, the improvement comprising, said spray bar means including first, second and third spray bars each extending crosswise of the vehicle and respectively having first, second and third sets of fixed orifice spray nozzles spaced therealong, the number and orifice size of the nozzles of the first set being selected to spray liquid product generally uniformly along the length of the first spray bar at flow rates in a low flow range in response to spray bar pressures in a preselected pressure range, the number and orifice size of the nozzles in the second set being selected to spray liquid product generally uniformly along the length of the second spray bar at flow rates in an intermediate flow range in response to spray bar pressures in said preselected pressure range, the number and orifice size of the nozzles in said third set of nozzles being selected to spray liquid product in an upper flow range in response to spray bar pressure in said preselected pressure range, liquid product flow rate sensing means including a rotary positive displacement type flow meter in the delivery conduit means between the pump outlet and the spray bar means substantially independent of the pressure on the liquid product and a first sensing means for producing a first electrical control signal correlative with the rate of flow of liquid product to the spray bar means, valve means for controlling flow to said spray bars, valve control means responsive to said first sensing means for operating said valve means to pass liquid product to only said first spray bar when said flow meter senses flows in said low flow range; to pass liquid product to said second spray bar when said flow meter senses flows in said intermediate flow range; and to pass liquid product to said third spray bar when said flow meter senses flows in said upper flow range, vehicle speed sensing means for producing a second electrical control signal correlative with the speed of the vehicle, flow control means responsive to said first and second control signals for controlling the flow of liquid product to said delivery conduit means to maintain a preset ratio between the speed of the vehicle and the rate of flow of liquid product to the spray bar means, said flow control means including means selectively adjustable for adjusting the preset ratio to be maintained between the speed of the vehicle and the rate of flow of liquid product to the spray bar means to vary the spread density.

8. A liquid distributor apparatus according to claim 7 wherein said valve control means is arranged to operate the valve means to pass liquid product to both said first and second spray bars when the flow meter senses flows in said intermediate flow range and to said first, second and third spray bars when the flow meter senses flows in said upper flow range.

9. A liquid distributor apparatus according to claim 7 wherein said product pump means comprises a centrifugal pump.

10. A liquid distributor apparatus according to claim 7 wherein said flow control means includes variable speed drive for driving said pump and means for varying the speed of said drive means to maintain a preset selectively adjustable ratio between the speed of the vehicle and the speed of the rotary flow meter.

11. A liquid distributor apparatus according to claim 7 wherein said flow control means includes a flow regulating valve between said pump means and said flow meter and means for adjustably positioning said flow regulating valve to maintain a preset selectively adjustable ratio between the speed of the vehicle and the speed of the rotary flow meter.

12. A liquid distributing apparatus according to claim 7 wherein said preselected pressure range is from about 10 psi to about 150 psi.

* * * * *